2,733,629

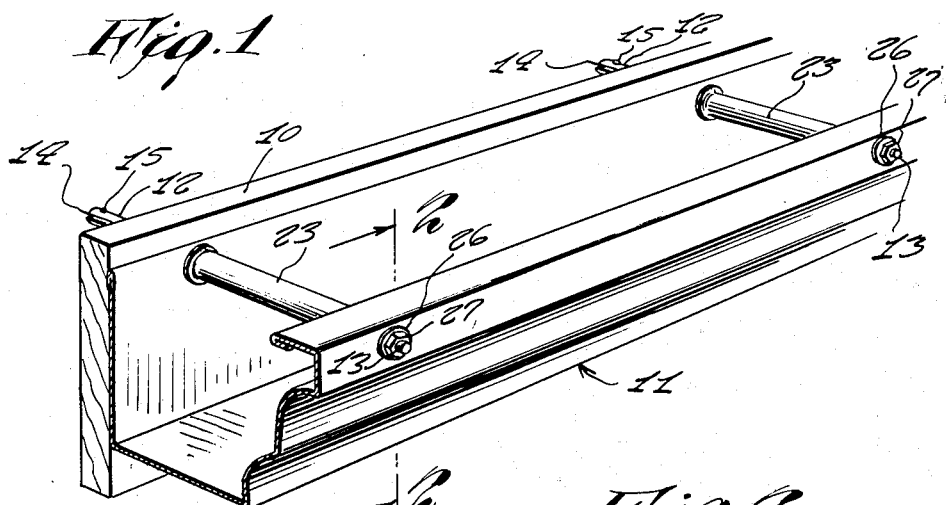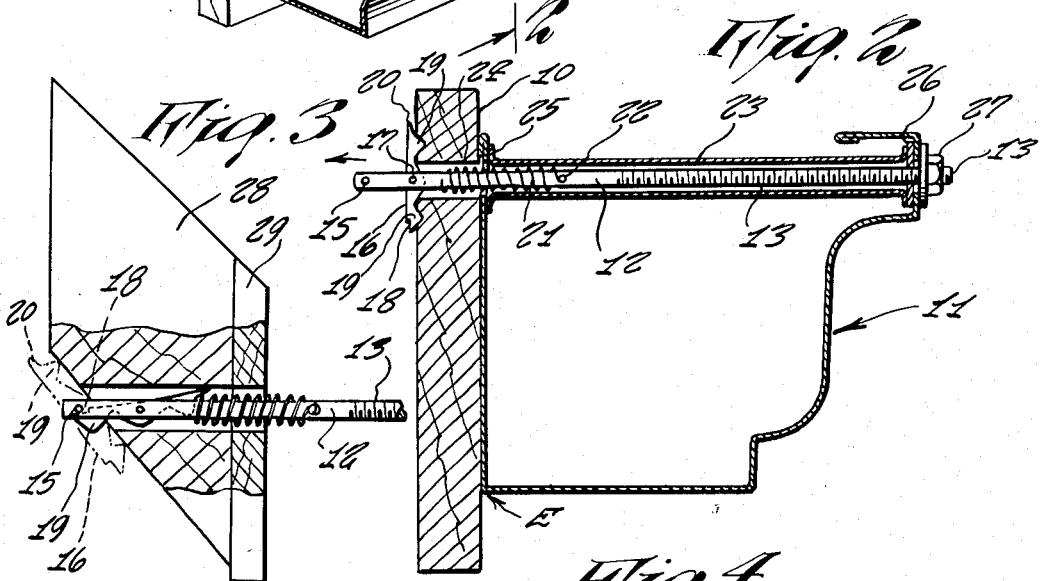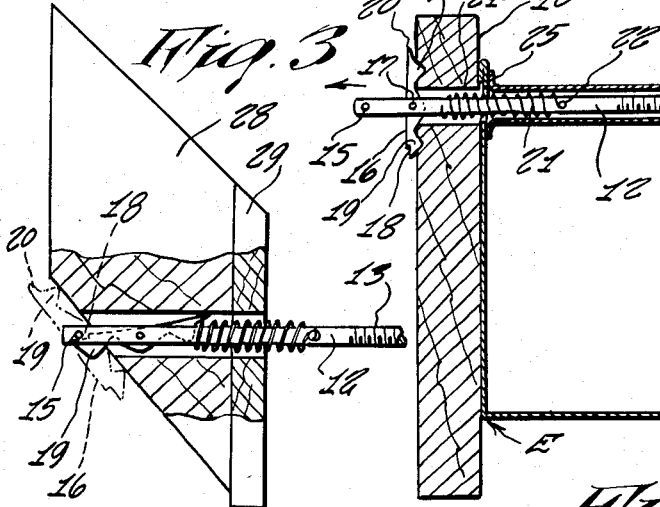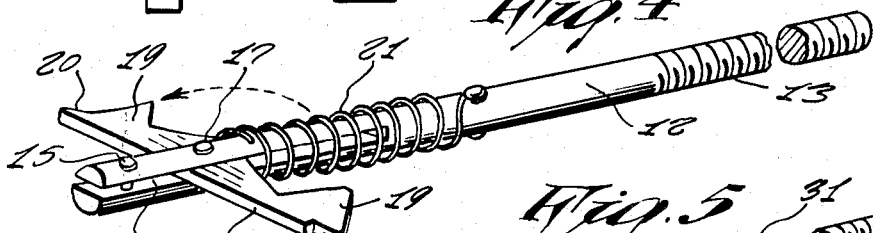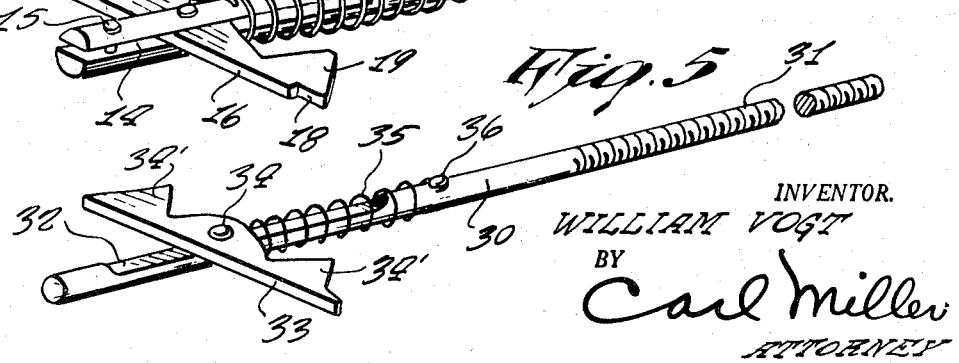

SPRING URGED PIVOTED TOGGLE BOLT

William Vogt, Jersey City, N. J.

Application August 18, 1952, Serial No. 304,931

1 Claim. (Cl. 85—3)

This invention relates to spring urged pivoted toggle bolts.

It is an object of the present invention to provide a toggle bolt for use with gutters, drains and leaders for roofing where it is necessary to use pitch or asphaltum on the toggle to prevent decay or seepage in the event of overflow which includes spring means for opening the toggle after the asphaltum or pitch has been applied.

It is another object of the present invention to provide a toggle bolt of the above type which is of simple construction, inexpensive to manufacture, has a minimum number of parts, is easy to install and efficient in use.

For other objects and a better understanding of the invention, reference may be had to the following detailed description taken in connection with the accompanying drawing, in which:

Figure 1 is a perspective view of a roof gutter, showing one application of the invention;

Fig. 2 is a vertical sectional view taken along the line 2—2 of Fig. 1;

Fig. 3 is a view similar to Fig. 2, but showing a modified application of the invention;

Fig. 4 is a perspective view of the invention designed for heavy duty and shown alone; and Fig. 5 is a perspective view of the modified form designed for light duty.

Referring now to the figures (Figs. 1 and 2), 10 represents a trimboard to which a gutter 11 for rain is to be secured. In the practice of my invention, improved toggle bolt means are provided for securing the gutter 11 to the trimboard 10 and comprise an elongated shaft 12 externally threaded at one end as at 13 and provided at the other end with an inwardly extending elongated slot 14 (Fig. 4). A pin or rivet 15 pierces the shaft 12 at one end of the slot 14. A toggle 16 is pivotally mounted within the slot 14 by means of a pin or rivet 17, the straight edge of the toggle 16 being provided at one end with a cut out 18 in which the rivet 15 is received when the toggle is in the closed position (Fig. 3). The edge of the toggle 16 remote from the side having the cut out 18 is provided with teeth 19 adapted to embed themselves in the rear face of the board 10 (Fig. 2), this edge at one end being provided with a lip 20 adapted to prevent a compression spring 21 sleeving the shaft 12 and secured to a rivet 22 from interlocking with the toggle when the latter is closed and ready for use and which lip at the same time prevents the toggle from rotating past the rivet 15 when the toggle is opened. The spring 21, it will be noted, sleeves the shaft 12 adjacent the rivet 17 with the end remote from the pin 22 abutting the central portion of the toggle when the latter is in the open position of Fig. 4. A tube 23 sleeves the bolt 12 intermediate the two sides of the gutter 11, the tube 23 being flanged at both ends. It will be noted that the board 10 is provided with a bore 24 aligned with an opening 25 in the inner wall of the gutter 11, the toggle bolt passing (in a closed position) through these openings in the direction of the arrow of Fig. 2 to spring into the open, operative position with the teeth 19 bearing against the rear face of the board 10. Washers 26 are provided on the shaft 12 on each side of the outer side of gutter 11 and a hexagonal nut 27 is screwed onto the end of the bolt to complete the construction.

Fig. 3 shows an application of the boggle bolt of Fig. 4 to a beam structure 28 including the trimboard 29, the application being at an angle of 50 degrees or more.

Returning to Fig. 2, it will be noted that there is added support in the gutter 11 caused by downward pressure at the left end of the base, as indicated at E, important in the event of heavy snowslides, tree branches or the like depositing in the gutter. When the toggle bolt is used in this type of construction, it is necessary to use pitch or asphaltum on the toggle to prevent decay or seepage in the event of overflow. It is, however, advisable to use the same procedure on all types of installation. The compression spring 21 will open the toggle 16 after the asphaltum or pitch has been applied. In the event of damage through ice, sleet, falling branches or the like to the gutter 11, the latter may be easily removed and straightened, repaired and replaced without additional cost or labor. The gutter is readily replaced merely by tightening the nut 27, securing the toggle 16 deeper into the wood 10 for firm support.

Referring to Fig. 5, there is shown a modified form of the invention wherein a shaft 30 of less diameter than the shaft 12 is externally threaded at one end at 31 and provided at the other end with a notch 32. A toggle 33 is pivotally mounted within the notch 32 by a pin or rivet 34 and is provided with teeth 34'.

A compression spring 35' leaves the shaft 30 along the notch 32 and adjacent to the toggle 33, the spring being connected to the shaft 30 by a pin 36. The toggle bolt of Fig. 5 will be used under the same type of application as the toggle bolt of Figs. 1 through 4, only due to a lack of shaft material it cannot be slotted and works with a clearance on one side of the shaft. The tie bolt of Fig. 5 is particularly adapted for light duty.

While various changes may be made in the detail construction, it shall be understood that such changes shall be within the spirit and scope of the present invention, as defined by the appended claim.

Having thus set forth and disclosed the nature of my invention, what is claimed is:

A toggle bolt comprising an elongated shaft externally threaded at one end and having an inwardly extending longitudinal slot at the other end, a toggle pivotally mounted within said slot, a compressive spring sleeving said shaft adjacent said toggle and connected to said shaft at the end remote from said toggle, the free end of said spring bearing against the central portion of said toggle when the latter is in open position, a pin connecting the slides of said shaft at the outer end of said slot and said toggle having a cut-out at the outer face of one corner for abutting said pin when said toggle is in closed position, said toggle having a lip at the inner face of the other corner for preventing said spring from interlocking when said toggle is in closed position, and a plurality of teeth at the inner face of said toggle adapted to be embedded into material bearing against said toggle.

References Cited in the file of this patent

UNITED STATES PATENTS

| | | |
|---|---|---|
| 231,334 | Kraus | Aug. 17, 1880 |
| 513,182 | Grubb | Jan. 23, 1894 |
| 592,979 | Bartlett | Nov. 2, 1897 |
| 1,075,759 | Burridge | Oct. 14, 1913 |
| 1,112,622 | Jones | Oct. 6, 1914 |
| 1,371,396 | Reveny | Mar. 15, 1921 |
| 1,388,190 | Mess | Aug. 23, 1921 |
| 2,567,372 | Gelpcke | Sept. 11, 1951 |